United States Patent [19]

Bader et al.

[11] 4,343,013

[45] Aug. 3, 1982

[54] NOZZLE PLATE FOR INK JET PRINT HEAD

[75] Inventors: Leonhard Bader, Stadtbergen; Frank Giessner, Augsburg; Friedrich B. Rombach, Augsburg; Hermann Winter, Augsburg, all of Fed. Rep. of Germany

[73] Assignee: NCR Corporation, Dayton, Ohio

[21] Appl. No.: 196,408

[22] Filed: Oct. 14, 1980

[51] Int. Cl.$^3$ .............................................. G01D 15/18

[52] U.S. Cl. .................................... 346/140 R; 346/75

[58] Field of Search .................................. 346/140, 75

[56] References Cited

U.S. PATENT DOCUMENTS

| | | | |
|---|---|---|---|
| 3,946,398 | 3/1976 | Kyser | 346/140 X |
| 4,007,464 | 2/1977 | Bassous | 346/75 |
| 4,158,847 | 6/1979 | Heinzl | 346/140 |
| 4,257,052 | 3/1981 | Stoneburner | 346/75 |

OTHER PUBLICATIONS

Baker, R. W.; Surface Treatment of Nozzles for Ink Jet Printers; IBM TDB, vol. 22, No. 5, Oct. 1979, pp. 1965–1966.

*Primary Examiner*—Joseph W. Hartary
*Attorney, Agent, or Firm*—J. T. Cavender; Wilbert Hawk, Jr.; George J. Muckenthaler

[57] ABSTRACT

The nozzle plate of an ink jet print head is made of glass to provide a desirable wetting property for a stable meniscus of the ink column and the front surface of the plate is coated with a non-wetting material such as metal or plastic to prevent ink deposits at the front surface around the orifice. Any ink deposits at such front surface would adversely affect the ejection of ink droplets.

2 Claims, 4 Drawing Figures

FIG. 1
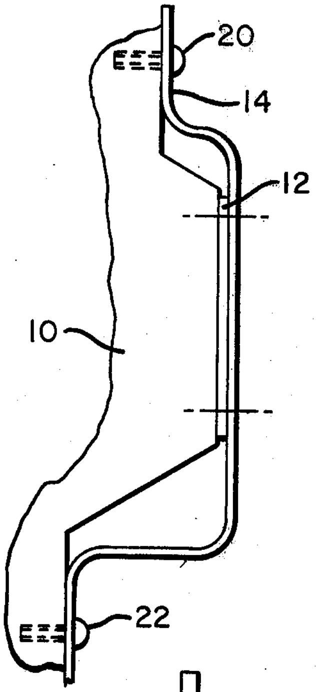
FIG. 2
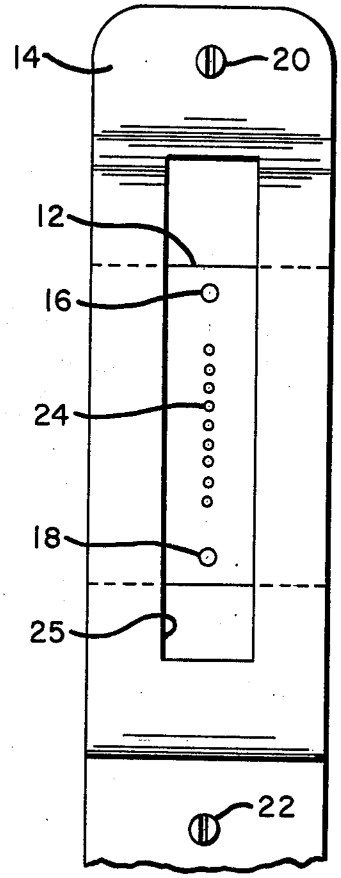
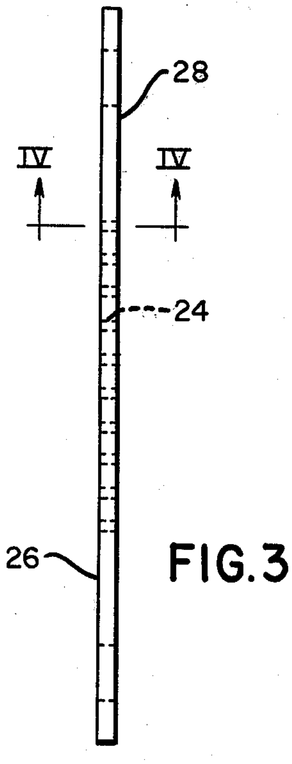
FIG. 3
FIG. 4
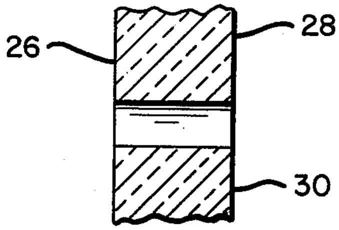

NOZZLE PLATE FOR INK JET PRINT HEAD

BACKGROUND OF THE INVENTION

In the field of non-impact printing, the most common types of printers have been the thermal printer and the ink jet printer. When the performance of a non-impact printer is compared with that of an impact printer, one of the problems in the non-impact machine has been the control of the printing operation. As is well-known, the impact operation depends upon the movement of impact members such as wires or the like and which are typically moved by means of an electromechanical system which is believed to enable a more precise control of the impact members.

The advent of non-impact printing, as in the case of thermal printing, brought out the fact that the heating cycle must be controlled in a manner to obtain maximum repeated operations. Likewise, the control of ink jet printing in at least one form thereof must deal with rapid starting and stopping movement of the ink fluid from a supply of the fluid. In each case, the precise control of the thermal elements and of the ink droplets is necessary to provide for both correct and high speed printing.

In the matter of ink jet printing, it is extremely important that the control of the ink droplets be precise and accurate from the time of formation of the droplets to depositing of such droplets on paper or like record media, and to make certain that a clean printed character results from the ink droplets. While the method of printing with ink may be performed in a continuous manner or in a demand pulse manner, the latter method is disclosed in the present application as applying the features of the present invention. The drive means for the ink droplets is generally in the form of a crystal element to provide the high speed operation for ejecting the ink through the nozzle while allowing time between droplets for proper operation. The ink nozzle construction must be of a nature to permit fast and clean ejection of ink droplets from the print head.

It is therefore proposed to provide a nozzle plate on the print head to maintain high speed ink jet printing.

Representative prior art in the field of ink jet print head nozzles includes German Application No. 2,024,330, of T. Yanou et al., opened to the public on Nov. 26, 1970. This publication discloses an ink jet printer having a nozzle formed as a capillary tube of glass and a water repellent coating on the tube except for the front edge surface thereof.

German Application No. 2,434,794, of R. Strecker opened to the public on Feb. 5, 1976, discloses an ink jet print head having a nozzle plate of dielectric material and provided with a pair of electrodes, one electrode at the beginning and the other electrode at the end of the nozzle.

German Application No. 2,460,131, of H. Sicking et al. opened to the public on July 1, 1976, discloses an ink jet print head and a process for making a nozzle plate and including coating the outer surface of the plate as well as the inner cylindrical surface to eliminate the roughness of the surfaces.

German Application No. 2,728,657, of E. Kattner, opened to the public on Jan. 4, 1979, and corresponding to U.S. Pat. No. 4,209,794, discloses a nozzle plate for an ink jet print head wherein the orifices each have an ink input area and a tapered acceleration area.

U.S. Pat. No. 3,921,916, issued to E. Bassous on Nov. 25, 1975, discloses a method of producing fluid nozzles in monocrystalline silicon utilizing anisotropic etching through the silicon to an integral etch-resistant barrier layer in a semiconductor wafer.

U.S. Pat. No. 3,949,410, issued to E. Bassous et al. on Apr. 6, 1976, discloses a jet nozzle design in a crystalline semiconductor block of silicon with an electrode structure which is integrally incorporated therewith and whereby a variable electric field is established near the orifice of the jet nozzle structure.

U.S. Pat. No. 4,007,464, issued to E. Bassous et al. on Feb. 8, 1977, discloses an array of nozzles formed by etching a semiconductor wafer of silicon. The nozzles are each in the shape of a truncated pyramid with the entrance and exit apertures being substantially square in cross-section.

And, U.S. Pat. No. 4,112,436, issued to D. R. Cone on Sept. 5, 1978, discloses a glass nozzle array for an orifice plate formed with a plurality of glass tubes and cemented in epoxy between two parallel glass plates and wherein spaced supports of oriented silicon are etched to form the grooves to align the glass tubes.

SUMMARY OF THE INVENTION

The present invention relates to ink jet printing, and more particularly to the construction of an ink jet print head wherein ink is caused to be driven through the print head in a manner to eject ink droplets from one or more nozzles thereof. The number of ink nozzles in the face of a print head may range from a single nozzle up to nine nozzles in alignment, for example, in a vertical direction to provide for dot matrix printing. It is not uncommon by reason of the fluid characteristics of the ink and the high speed of the driven ink droplets, that certain problems and trouble areas can and do exist in the ink jet printing operation. It is therefore believed that the present invention includes subject matter which eliminates or at least minimizes the problems in ink jet printing.

The existence of an ink mark or spot on the paper or like record media and then the non-existence or absence of an ink spot may indicate that the nozzle plate of the ink jet print head requires cleaning or rinsing. The actual position of the ink mark may be different from the desired position and this condition may be caused by an improper delay time or an incorrect speed of the ink droplet relative to the speed of the moving print head. Another problem or trouble area may be that the actual size of the ink spot or mark on paper does not correspond with the desired ink spot size. Additionally, the precise optical properties of the ink spot in regard to the contrast or reflection characteristics may not be within the scope of the specification. In some cases, the ink droplet drive means may be altered or adjusted to correct certain conditions and provide for fast and accurate ink jet printing.

In accordance with the present invention, the method of making and the structure of the nozzle plate on the print head include means for preventing ink from remaining at the nozzle in the form of ink deposits. The front surface of the nozzle plate and especially the area around the nozzle orifice is provided with a non-wetting coating or material with respect to the ink and wherein the coating or material is comprised of water-repellent metal or plastic. A glass nozzle plate is provided and the nozzles are produced by means of a photo-etching process to maintain uniformity of the nozzles and maintain narrow tolerances along with an economic means of manufacturing. The nozzles are substantially cylindrical in shape by the formation thereof during the etching process. The glass has a good wetting property for water and aqueous inks and the meniscus of the ink column within the nozzle is better stabilized in regard to movement of the print head.

In the present invention the front side of the nozzle plate is coated with an ink-repellent material such as chromium, nickel or "Teflon". The meniscus of the ink column extends only to the inner diameter of the nozzle and the outer surface is free of ink.

In view of the above discussion, the principal object of the present invention is to provide an ink jet print head which produces accurate and reliable ink droplets.

Another object of the present invention is to provide a nozzle plate for an ink jet print head to eliminate certain problems of ink control during operation of the print head.

An additional object of the present invention is to provide a nozzle plate for an ink jet print head wherein the ink column within the nozzle is maintained in a stable condition.

A further object of the present invention is to provide a nozzle plate which is coated with a non-wetting material to prevent ink deposits at the front surface of the plate.

Additional advantages and features of the present invention will become apparent and fully understood from a reading of the following description taken together with the annexed drawing.

BRIEF DESCRIPTION OF THE DRAWING

FIG. 1 is a side elevational view of a print head incorporating the subject matter of the present invention;

FIG. 2 is a front view of the nozzle plate shown in FIG. 1;

FIG. 3 is an enlarged sectional view taken along the plane 3—3 of FIG. 2; and

FIG. 4 is a greatly enlarged view of one of the nozzles in the plate.

DETAILED DESCRIPTION OF THE INVENTION

Prior to describing the several figures of the drawings, it should be noted that known nozzle plates of single or of multiple nozzle print heads may consist of steel, silicon or nickel materials. Additionally, known methods for producing the nozzles within plates made of the above materials include mechanical drilling, laser beam boring, electron beam boring, material depositing spark erosion and etching.

Since certain requirements are set for the nozzles in an ink jet printer, such as, for example, reliable and proper functioning, uniformity of all the nozzles, the maintaining of close tolerances and an economical process of manufacture, it has been found that the above materials and the noted manufacturing processes do not always satisfy these requirements.

The present invention provides that the nozzle structure material of glass, together with the photoetching process of forming the nozzles and the coating on the outer surface of the plate, result in a higher accuracy of the individual nozzles and also in a higher print quality of the print head.

FIGS. 1 and 2 show a side elevational view and a front view of an ink jet print head 10 having on the face thereof a nozzle plate 12 and a leaf spring 14 for securing the plate to the print head. The nozzle plate 12 is secured by studs 16 and 18 to the head 10 and the leaf spring 14 is secured to the head in overlying fashion by screws 20 and 22. The nozzle plate 12 includes the substrate material with, for example, nine nozzles 24 therethrough and the leaf spring has an opening or window 25 therein for the nozzles.

FIG. 3 shows an enlarged side view of the nozzle plate 12 with the nozzles 24 therein. The inner surface 26 or the left side of the plate is smooth glass and is easily wettable for ink adherence, whereas the outer surface 28 is positioned and is resistant to wetting. The nozzle plate 12 is made of glass and the nozzles 24 are produced by a photoetching process with the resultant nozzles being circular, sharp edged and substantially cylindrical in form. The glass nozzle plate results in the high accuracy of printed characters and a high reliability. The glass structure of the nozzle plate has a good wetting property for water and aqueous inks and is extremely beneficial for this feature from the inner surface 26 and through the nozzle 24 so that the meniscus of the ink column within the nozzle has a good stability which makes the print head relatively insensitive to movement and vibrations.

FIG. 4 shows a greatly enlarged one of the nozzles 24 of the glass plate 12 and is identified with the inner surface 26 and the outer surface 28. The nozzle 24 is shown as being cylindrical therethrough, however it may be slightly cone shaped for certain applications. The outer surface 28 is preferably coated with a non-wetting material 30 relative to the characteristics of the aqueous ink. Suitable materials for the non-wetting layer or coating 30 are water-repellent metals such as chromium or nickel, or water-repellent plastic materials, such as "Teflon" or certain of the silicon based materials. The non-wetting or water-repellent layer or coating 30 prevents deposits of ink at the front surface around the orifice of the nozzle 24. The presence of such ink deposits would adversely affect the ejection of ink droplets from the nozzle 24.

The depositing of the non-wetting material 30 such as chromium onto the glass plate 12 may be performed by means of a vacuum type process. If the depositing of the material is carried out in a vertical direction with respect to the plate to be coated, the orifice of the nozzle 24 need not be protected. In the case of cylindrical construction, the walls of the nozzles 24 extend in parallel manner with the direction of depositing of the non-wetting material 30. Additionally, where the walls of the nozzles 24 form a small negative angle, with respect to the direction of depositing of the material 30, the chromium or other metallic particles will not reach and settle on the walls of the nozzle.

If a non-aqueous ink is used in the printing, other suitable materials may be selected for finishing the nozzle plate 12 so that the inner face 26 of the plate and the nozzle orifice itself is easily wettable whereas the outer face 28 of the nozzle plate is non-wettable.

It is thus seen that herein shown and described is a method for making a glass nozzle plate for an ink jet print head wherein the nozzle are produced by a photoetching process and one surface of the plate is made to be easily wettable whereas the other surface is non-wettable. The method and apparatus of the present invention enables the accomplishment of the objects and advantages mentioned above and, while a preferred embodiment of the invention has been disclosed herein, variations may occur to those skilled in the art. It is contemplated that all such variations not departing from the spirit and scope of the invention hereof are to be construed in accordance with the following claims.

We claim:

1. A nozzle plate for an ink jet print head comprising a thin, elongated glass substrate of ink wettable material, one side of said substrate having a surface suitable for ink adherence thereto, a plurality of substantially cylindrically-shaped nozzles formed in columnar manner to provide ink adhering surfaces through said substrate and equally spaced one from another, and a layer of ink resistant chromic material on the surface of the other side of said substrate and adjacent the orifice of each nozzle to prevent deposits of ink from adhering therearound.

2. An ink jet print head for ejecting ink in droplet form comprising a body portion having a face surface, a thin, elongated glass plate member secured to said body portion face surface, a plurality of equally spaced substantially cylindrically-shaped nozzles formed in columnar-aligned manner to provide ink adhering surfaces through said plate member, a leaf spring secured to said body portion and having an opening therein for accommodating said nozzles, and a coating of ink resistant chromic material on the surface of the side of said plate member distal from said body portion and adjacent the orifice of each nozzle to prevent particles of ink from adhering therearound.

* * * * *